July 11, 1944.  J. M. ROBERTS  2,353,268
ELECTRICAL APPARATUS
Filed Nov. 21, 1942
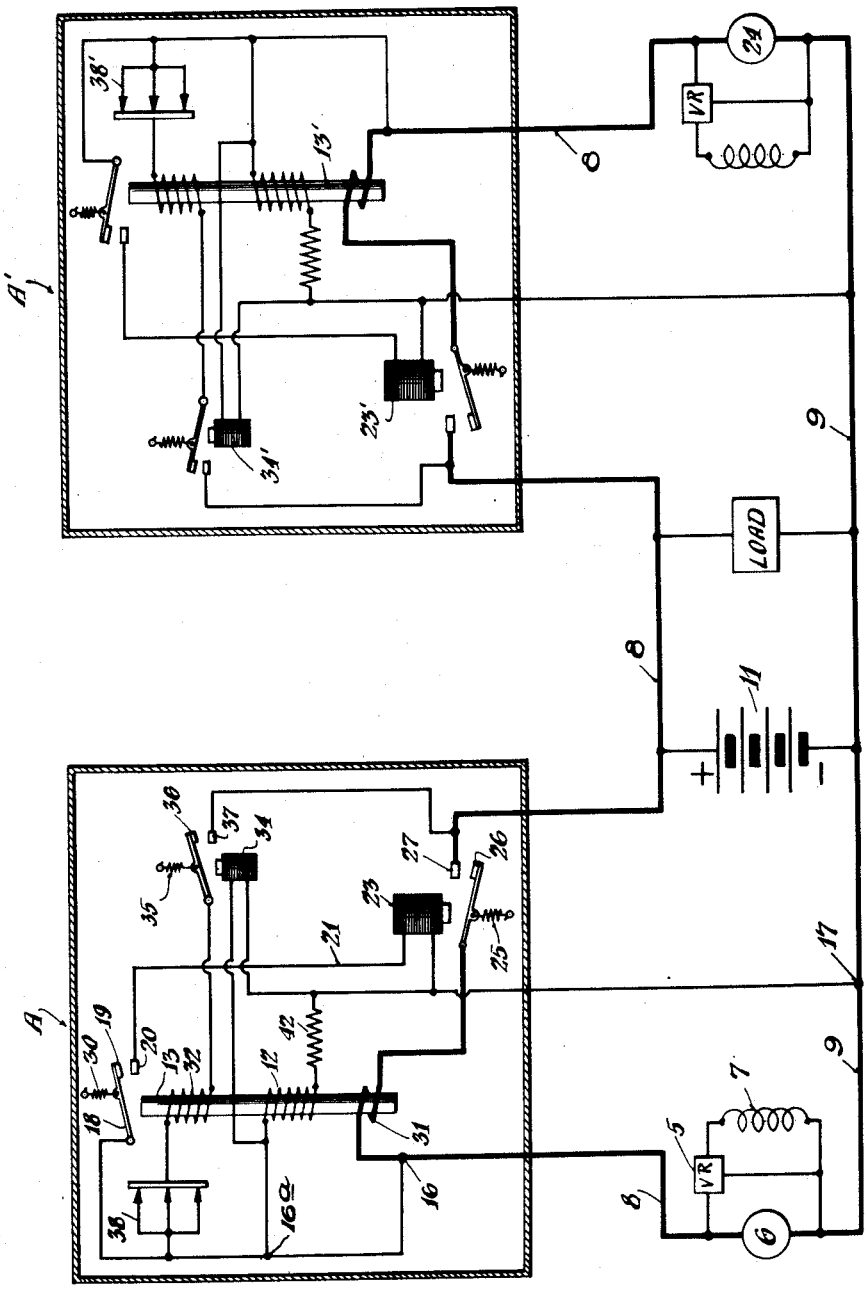
INVENTOR.
Jean M. Roberts
BY
Martin J. Finnegan
ATTORNEY Patented July 11, 1944

2,353,268

UNITED STATES PATENT OFFICE 2,353,268

ELECTRICAL APPARATUS

Jean M. Roberts, Ridgewood, N. J., assignor to Bendix Aviation Corporation, South Bend, Ind., a corporation of Delaware Application November 21, 1942, Serial No. 466,443

9 Claims. (Cl. 320—40)

This invention relates to circuit controlling mechanism, and particularly to means for controlling the flow of current in a battery-generator circuit of the character employed to supply the current-consuming equipment of a motor vehicle, airplane, or other craft having a built-in power plant driven at variable speed, especially when two or more generators of high current capacity are operated "in parallel."

The conventional reverse-current relay in automotive vehicle installations includes a core having "shunt" and "series" windings. The shunt winding is adapted to initially close the relay contacts when the generator voltage reaches the particular value for which the relay is adjusted. The series winding aids the shunt winding in holding the contacts closed as long as the generator voltage exceeds the battery voltage so that the generator is supplying current to the battery, and acts oppositely to open the relay contacts upon first surge of current from battery to generator, as when the generator speed drops. If such a relay were to be applied to a generator-battery system of the character now required in aircraft installations (involving generators of far greater current capacity, and having two or more generators, each with its own voltage regulator, supplying power to a common battery and load circuit) this conventional two-winding relay would not be satisfactory.

One reason is that when one or more generators are feeding the battery circuit, the battery terminal voltage may be higher than the voltage at which the relay for another incoming generator would close. Under these conditions, as when the driving engine is idling at a speed just high enough to cause the relay to close, the relay will close and may promptly open again because of reverse current. This closing and opening ("chattering" or "fluttering") will continue as long as the generator voltage remains lower than the battery voltage and yet higher than the voltage required for the shunt coil to close the relay.

Another reason is that the higher current values now obtaining require use of larger conductors and hence fewer turns, so that the magnetic effect of the series winding may be relatively weak with small reverse current. As is well known, the ampere-turns (magnetic exciting effect) required to cause a relay of this type to close initially is less than the ampere-turns required to hold the relay closed, since the armature is closer to the core in the closed position. For this additional reason the two-winding relay may have a tendency to "chatter" or "flutter" if the generator voltage remains near the closing value. This fluttering action causes undue wear on the relay and on the contacts connecting the generator to the battery circuit, and may cause damage to the contacts or to the generator if the reverse current is excessive. Therefore some means is desired to prevent the relay from closing unless the voltage of the incoming generator is slightly higher than that of the battery terminals. This result is accomplished by the invention described herein.

An object of this invention is, therefore, to provide novel controlling methods and means for application to a generator-battery circuit, to assure a greater measure of protection for the generator and control apparatus, particularly if the generator is of high current capacity and is operated in parallel with other generators, than would be possible otherwise.

Another object is to provide a system of control circuits and parts, one of which parts is a reverse-current relay of novel construction, and having novel interrelationship to the complementary parts of the complete system.

These and other objects of the invention will become apparent from inspection of the following specification when read with reference to the accompanying drawing wherein is illustrated the preferred embodiment of the invention. It is to be expressly understood, however, that the drawing is for the purpose of illustration only, and is not designed as a definition of the limits of the invention, reference being had to the appended claims for this purpose.

Referring to the drawing, reference characters 6 and 24 designate generators, each having a shunt field controlled by a voltage regulator and adapted to be connected by the line conductors 8 and 9 with a battery to be charged, indicated diagrammatically at 11; and each having a control unit, as shown at A and A'. Wound on the core 13 of the reverse-current relay of unit A—and the same is true of unit A'—is a winding 12 which is connected in series with a relatively high resistance 42, and tapped in the the line conductors 8 and 9 at the points 16 and 17, respectively. The armature 18 of the reverse-current relay has a contact 19 biased away from contact 20 by means of spring 30, and conductor 21 leads from contact 20 to the winding of a solenoid 23 whose contact member 26 is spring-biased away from contact 27 and constitutes the "line switch" for the line conductor 8. Alternatively, the switch 19, 20 could be inserted directly in the line 8 and the solenoid switch 23—27 omitted; but with high current values obtaining, the use of the arrangement illustrated is preferable due to its greater sensitivity.

A relatively low resistance winding 31, on core 13, is in series with the armature 26, and thus the two windings 12 and 31 correspond roughly to the conventional "shunt" and "series" windings of the conventional reverse-current relay; the said winding 31 acting cumulatively with winding 12 to tend to hold the circuit closed at 19, 20 while current is flowing from generator 6 to battery 11, and acting oppositely to winding 12 to tend to open said circuit at 19, 20 when current flows in the reverse direction.

As a means of avoiding the hereinabove-noted harmful chattering or fluttering action of conventional two-winding relays when used with high-current generators operated in parallel, my invention involves the use of a third winding 32 and a small auxiliary relay 34 having contacts 36, 37 in series with the winding 32, also a dry-plate rectifier 38 consisting of several discs connected in parallel with each other and in series with the winding 32; the said coil 32 being so wound as to assist the coil 12 in moving contact 19 into engagement with the contact 20; the coil 12 being of less than sufficient exciting capacity to close said contacts independently of coil 32 (at the highest battery terminal voltage expected), and the said coil 32 being, of course, unable to assist until the auxiliary relay contacts 36, 37 have closed. (However, the coil 12 alone must be capable of holding the contacts 19, 20 in the closed position after the line switch 26, 27 has closed.) The auxiliary relay contacts 36, 37 depend, for their closing, upon the building-up of an appreciable voltage across the generator terminals—not full voltage, but a close approach thereto, on the order of 80 to 90 per cent of full voltage. This generator voltage is applied to the winding of auxiliary relay 34 which has its winding connected to the generator terminals, being tapped into conductors 8 and 9 at points 16 and 17, respectively.

After contacts 36, 37 have closed generator 6 will normally continue to build up its voltage to the value corresponding to the setting of its voltage regulator, but if the generator speed is slightly low (as when the driving engine is being idled) the generated voltage may remain one or two per cent less than normal. Under these conditions it may be undesirable to allow contacts 19, 20 (hence 26, 27) to close, for the voltage across the battery terminals may still be higher than that of the generator 6. In fact, there may simultaneously be another generator (as shown at 24) on the battery circuit, and operating at full voltage rating, in which event the closing of contacts 26, 27 would establish a circuit for discharge of current into the generator 6, which has not yet reached full line voltage. Under these conditions coil 32 does not produce the required degree of assistance to the coil 12, for circuit-closing purposes, and in fact will not do so until the voltage across generator 6 builds up slightly above whatever voltage is co-existing across the battery terminals. When such build-up is achieved, the combined magnetic effects of coils 12 and 32 will close the contacts 19, 20, and this in turn will energize coil 23 to close line-switch 26, 27. Current will now flow from generator 6 to battery 11, by way of coil 31 and switch 26, 27. When line-switch 26, 27 is closed, the coil 32 is practically short-circuited so that it no longer aids coils 12 and 31 in holding contacts 19, 20 closed.

Subsequently, in the event that, and as soon as, generator voltage drops below battery voltage, even to a very slight degree, there will be a prompt opening of contacts 19, 20 (hence 26, 27) because the reverse current through the series coil 31 opposes the magnetic effect of the shunt coil 12. The calibration is such that a reverse current of less than 5 per cent of the generator current rating is sufficient to reduce the magnetic pull on armature 18 so that spring 30 causes contacts 19, 20 (hence 16, 17) to open. After contacts 16, 17 have opened, the slight leakage current through rectifier 38 and coil 32 in the reverse direction also opposes the magnetic effect of coil 12 and helps to prevent contacts 19, 20 from reclosing, even though the generator voltage remains just slightly below the battery voltage. Rectifier 38, however, prevents the reverse current through coil 32 from becoming large enough to reverse the magnetic flux through core 13; hence this rectifier provides assurance against any overbalance of the magnetic effect of coil 12 sufficient to close contacts 19 and 20 when the generator voltage is very much below the battery voltage.

Resistance 42 is chosen of proper value to adjust the current flow in coil 12 to the desired value, and is made of material such that the resistance is only slightly affected by temperature. A hand-switch (not shown) may be provided between 16 and 16a to permit opening of the circuit manually, if desired.

The auxiliary relay 34 prevents the reverse voltage on rectifier 38 from reaching a value high enough to damage the rectifier, and prevents leakage of current from the battery through coil 32 when the generator 6 is not running.

Unit A' will, of course, function similarly for protection of generator 24.

What is claimed is:

1. In a device of the class described, in combination with a generator and a battery, and a line circuit therebetween, means including a reverse-current relay for controlling the opening and closing of said line circuit, said reverse current relay including an armature, a magnetic pole-piece having a shunt winding connected across the line circuit, a series winding inserted in one side of the line circuit, and a differential winding in parallel connection with said series winding, and current rectifying means and auxiliary contacts in series connection with said differential winding, said differential winding being responsive to the difference between the generator and battery terminal voltages to assist said shunt winding to cause said armature to move to the line-closing position only when the generator voltage is slightly higher than the battery voltage, means to cause said armature to move to the line-opening position as soon as there is a reverse current in said series winding, and before such reverse current builds up to more than a small fraction of the value which the forward current flow normally attains, and means to automatically open said auxiliary contacts and thereby break circuit through said differential winding to prevent leakage of current from said battery when said generator is not running.

2. In a device of the class described, in combination with a generator and a battery, and a line circuit therebetween, means including a reverse-current relay for controlling the opening and closing of said line circuit, said reverse current relay including an armature, a magnetic pole-piece having a shunt winding connected across the line circuit, a series winding inserted in one side of the line circuit, and a differential winding in parallel connection with said series winding, and responsive to the difference between the generator and battery terminal voltages to cause said armature to move to the line-closing position only when the generator voltage is slightly higher than the battery voltage, means to move said armature to the line-opening position upon reverse current flow, and automatic means independent of said reverse current relay to prevent leakage of current from said battery through said differential winding when said generator is not running.

3. In a device of the class described, in combination with two or more generators, and a line circuit therebetween, means including a reverse-current relay for controlling the opening and closing of said line circuit, said reverse current relay including an armature, a magnetic pole-piece having a shunt winding connected across the line circuit, and a series winding inserted in one side of the line circuit, means responsive to the difference between the generator and line terminal voltages, to cause said armature to move to the line-closing position only when the generator voltage is slightly higher than the line terminal voltage, means to move said armature to the line-opening position upon reverse current flow, and automatic means independent of said reverse current relay to prevent leakage of current from said line circuit when said generator is not running.

4. In a device of the class described, in combination with a first generator and a battery, and a line circuit therebetween, means including a reverse-current relay for controlling the opening and closing of said line circuit, said reverse current relay including an armature, a magnetic pole-piece having a shunt winding connected across the line circuit, a series winding inserted in one side of the line circuit, auxiliary means to assist said shunt winding in effecting initial closure of the line circuit, a second generator in circuit with said battery, and means responsive to reverse current flow in said line circuit to move said armature to the line-opening position and said auxiliary means preventing the closure of said line circuit until the voltage developed by said first generator rises above the voltage developed by said second generator for preventing current flowing from said second generator to said first generator.

5. In a device of the class described, in combination with a generator and a battery, and a line circuit therebetween, means including a reverse-current relay for controlling the opening and closing of said line circuit, said reverse current relay including an armature, a magnetic pole-piece having a shunt winding connected across the line circuit, a series winding inserted in one side of the line circuit, and a differential winding in parallel connection with said series winding, means for energizing said differential winding, means for preventing movement of said armature to the circuit closing position prior to operation of said energizing means, said preventing means being further operative in the event of reverse current flow in said line circuit to move said armature back to the line-opening position, and means independent of said reverse current relay for controlling the energization of said differential winding in response solely to the operation of said generator.

6. In a device of the class described, in combination with a first generator and a battery, and a line circuit therebetween, means including a reverse-current relay for controlling the opening and closing of said line circuit, said reverse current relay including an armature, a magnetic pole-piece having a shunt winding connected across the line circuit, a series winding inserted in one side of the line circuit, and a differential winding in parallel connection with said series winding, a second generator in circuit with said battery, means for energizing said differential winding, and means responsive to reverse current flow in said line circuit to move said armature to the circuit opening position and said differential winding preventing the movement of said armature to a line-circuit closing position until the voltage developed by said first generator rises to a predetermined value above the voltage developed by said second generator for preventing the flow of current from said second generator to said first generator.

7. In combination with a storage battery and a pair of generators in circuit therewith, a line switch interposed between one of said generators and said battery, a second line switch between the other of said generators and said battery, and means individual to each switch to prevent closure thereof until the voltage developed by the associated generator rises somewhat above the voltage concurrently existing across the terminals of the other generator, wherefore there is prevented any possibility of current flowing from said last-named generator to the other at the instant of closing said line switch.

8. In combination with a pair of generators and a line circuit therebetween, a line switch in said circuit, adjacent to one of said generators, a second line switch adjacent to the other of said generators, and means individual to each switch to prevent closure thereof until the voltage developed by the associated generator rises slightly above the voltage concurrently existing across the terminals of the other generator, wherefore there is prevented any possibility of current flowing from said last-named generator to the other at the instant of closing said line switch.

9. In a device of the class described, comprising, in combination with a generator and a battery, and a line circuit therebetween, a first switch means controlling the opening and closing of said line circuit, an armature operating said first switch means, a magnetic pole-piece having a first shunt winding connected across the line circuit, a series winding inserted in one side of the line circuit and controlled by said first switch means, a differential winding in parallel connection with said series winding, current rectifying means and a second switch means in series connection with said differential winding, said differential winding being responsive to the difference between the generator and battery terminal voltages and arranged to assist said first shunt winding to cause said first switch means to effect initial closure of said line circuit only when the generator voltage is slightly higher than the battery voltage, said series winding causing said first switch means to move to a line-opening position as soon as there is a reverse current in said series winding, and a second shunt winding acting independently of said other windings and connected across said first shunt winding for causing said second switch means to close the circuit for said differential winding upon operation of said generator.

JEAN M. ROBERTS.